United States Patent [19]

Schwichtenberg

[11] 4,337,682
[45] Jul. 6, 1982

[54] PIANO SOUNDBOARD

[75] Inventor: Gerhard Schwichtenberg, Wolfenbüttel, Fed. Rep. of Germany

[73] Assignee: Wilhelm Schimmel Pianofortefabrik GmbH, Fed. Rep. of Germany

[21] Appl. No.: 140,488

[22] Filed: Apr. 15, 1980

[30] Foreign Application Priority Data

Apr. 20, 1979 [DE] Fed. Rep. of Germany ....... 2915959

[51] Int. Cl.³ .............................................. G10C 3/06
[52] U.S. Cl. ........................................ 84/193; 84/291; 84/452 R
[58] Field of Search .......... 84/184, 187, 189, 192–196, 84/212–213, 291, 452 R

[56] References Cited

U.S. PATENT DOCUMENTS

| | | | |
|---|---|---|---|
| 1,534,309 | 4/1925 | Frankel | 84/196 |
| 1,643,139 | 9/1927 | Sulak | 84/212 |
| 2,469,522 | 5/1949 | Sauerland | 84/192 |
| 3,641,862 | 2/1972 | Rendell | 84/291 |
| 4,248,124 | 2/1981 | Klaiber et al. | 84/195 |

FOREIGN PATENT DOCUMENTS

| | | | |
|---|---|---|---|
| 26020 | of 1897 | United Kingdom | 84/192 |
| 4703 | of 1898 | United Kingdom | 84/194 |
| 581954 | 7/1946 | United Kingdom | . |
| 591268 | 9/1947 | United Kingdom | . |
| 1298435 | 11/1972 | United Kingdom | . |
| 1300356 | 12/1972 | United Kingdom | . |
| 1435126 | 8/1976 | United Kingdom | . |

*Primary Examiner*—Lawrence R. Franklin

[57] ABSTRACT

A laminate soundboard for a piano or the like having a metal core of a modulus of elasticity and an inherent damping factor corresponding to steel of at least a grade St 34, and at least one outer cover layer of wood or plastic bonded thereto in full surface contact on each side thereof. The outer cover layers have a damping characteristic corresponding to that of wood.

15 Claims, 8 Drawing Figures

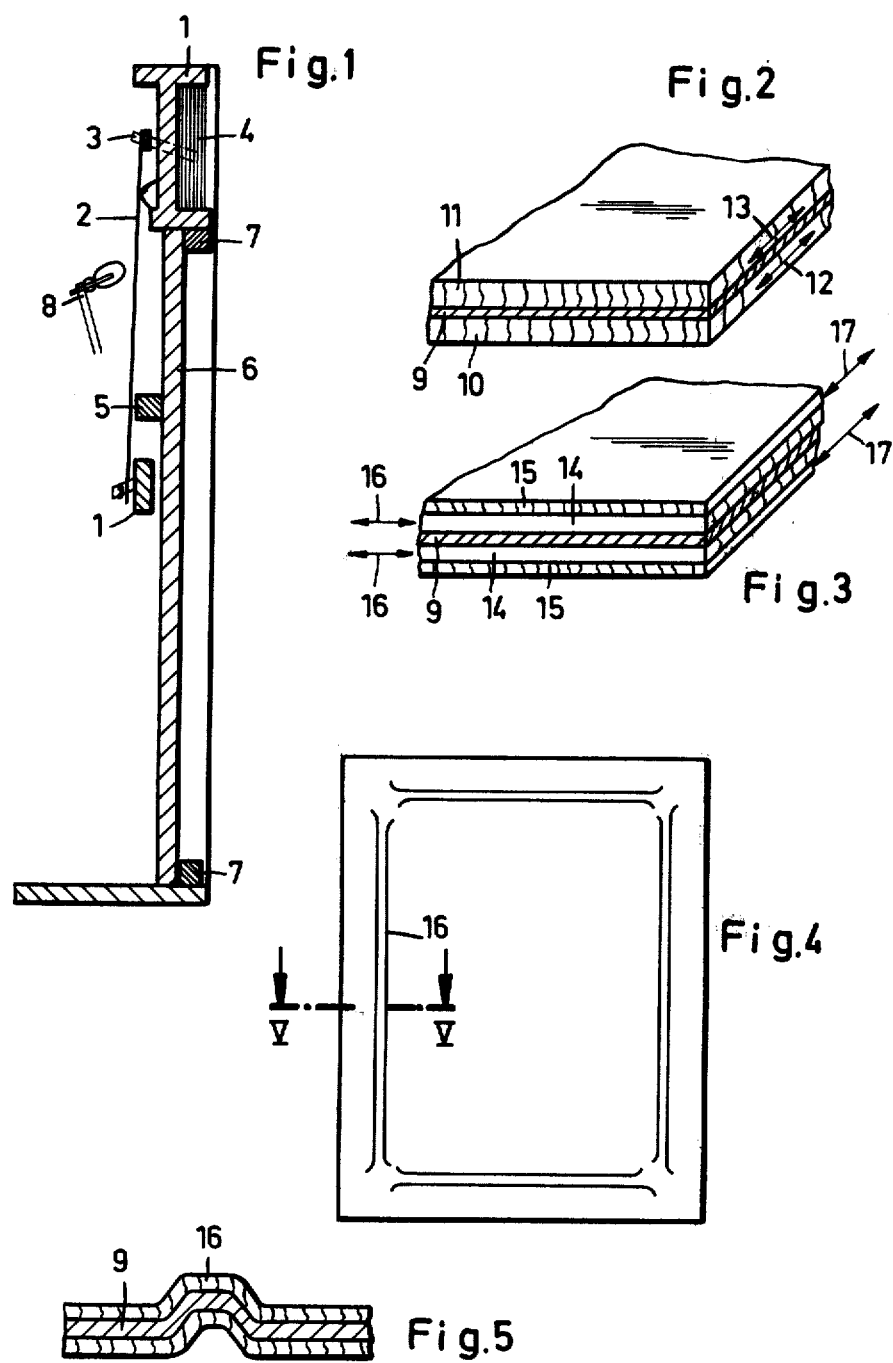

PIANO SOUNDBOARD

BACKGROUND OF THE INVENTION

The present invention relates to a soundboard for string instruments, especially pianos, harpsichords, or the like.

Percussive string instruments, such as pianos or grand pianos, are known to be equipped with resonators having plate-shaped soundboards, which function to transmit the vibrations of the string to the air while at the same time increasing the sound emission or volume. In conventional constructions, the soundboards are made from solid wood, preferably from especially grown and selected conifers, such as fir, spruce, pine or hemlock. However, due to the reduction in the conifer stock, it has become more and more difficult to find suitable woods having the necessary qualities for the making of soundboards. The known soundboards made from solid boards are very susceptible to varying relative air humidity, by which the interior stresses are subject to continuous changes, in particular at the beginning and the end of indoor heating periods. Such stress will interfere also with the inner vibration conditions of the soundboard so that, when the vibrations of the strings are transmitted to the air, the transmission characteristics are subjected to undesirable change.

In order to avoid the aforementioned difficulties, soundboards have been made from plastic materials which, it is true, offer the advantage of being less affected by temperature and humidity variations, but lead to unsatisfactory results due to excessive damping, especially in the high frequencies.

It is a known fact that in order to obtain good transmission characteristics, it is desirable that, in the entire audible frequency range, the ratio of the modulus of elasticity to the density of the soundboard should be as great as possible. As far as the inherent characteristics of wood and also plastic materials are concerned, such ratio can, only to a slight extent, be influenced by an adequate selection of the type of wood or of the composition of the plastic material. Therefore, because of the inherent damping of wood materials as well as plastic material, the transmission characteristic of vibrations of high frequencies are unfavorably affected.

It is the object of the present invention to construct a soundboard where, in addition to its being substantially uninfluenced by humidity and heat variations, the damping of the vibrations transmitted is kept at as low a level as possible, thereby resulting in an increase of the sound release in the entire frequency range in question. It is a further object to provide a construction wherein it is possible to exert a selective influence on the degree of damping.

SUMMARY OF THE INVENTION

According to the present invention, a soundboard is formed of laminate construction having a metal core plate, preferably of steel, having a modulus of elasticity and an inner damping factor corresponding at least to steel of the grade ST 34. Bonded on each of the surfaces of the core plate in full surface contact and parallel with it, are one or more cover layers, consisting of wood or of a material, such as plastic, having damping characteristics corresponding approximately to those of wood.

It is true that there have been proposed soundboards comprising a plate-shaped foam plastic material having a density of from 0.05 to 0.3, with additional layers bilaterally applied thereto, which are made from materials having a higher modulus of elasticity, such as wood or glass-reinforced plastic material. However, even with such soundboards, an increase in sound emission is not obtainable over the entire frequency range, due to the high damping resulting from the layer of low-density foam plastic material. Such damping, conditioned by the mentioned plate-shaped member of low-density foam plastic material, cannot be lessened even through the use of reinforcing outer layers made from materials having a greater density, such as wood or glass-reinforced plastic material.

In contra-indication thereto, the laminate construction of the present invention forms a vibration-carrying member in its metal core, of very low damping characteristics, whereas its covering layers provide the damping effect, such that the sound emission takes place without sharp or distinctive resonances of individual frequencies. It is thus possible to attain optimum damping characteristics over the entire frequency range so as to select the total sound effect. The desired degree of damping can be selected by the choice of the material and by the building of the cover layers as a function of the specific steel plate used.

In one embodiment of the invention, the covering layers comprise sheets (boards, plates or the like) of wood. Preferably, the grain or fiber directions are uniformly oriented. It is sometimes preferable to form each of the covering layers of a plurality of wooden superimposed sheets in which the fiber orientations of adjacent sheets extend at right angles with each other. This will prevent unfavorable stress or tension conditions from developing within the soundboard. The wood layers employed as covering layers need not be of the same quality as required for the manufacture of soundboards made from solid board, and other woods may be used.

In another embodiment of the invention, the cover layers, instead of consisting of wood plates, are made from plastic sheeting, especially plates or laminates from plastic material, of which the fibers, or molecular orientation, in adjacent layers, extend approximately at right angles with each other. By the selection of the respective materials, for the entire laminates, there can be obtained differing damping characteristics.

A further improvement of the sound emission of the soundboard is possible through the reduction of the flexural strength of the metal core plate, particularly in the marginal areas thereof. This can be attained by forming punchings or recesses in the marginal zones, or by providing a bead or roll along the edge of the metal sheet, as compared to the middle portion thereof. Such reduction in strength will improve the vibration capacity of the soundboard and, thus, provide favorable conditions for vibration transmission.

To obtain the aforementioned differential properties regarding flexural strength in the marginal area and in the middle area of the soundboard, it is also possible, in addition to, or independently of the previous measures, to provide the metal plates in the middle portion thereof with a reinforcement which increases its flexural strength (e.g., making it less flexible) than in the marginal zones. Reinforcing strips, preferably steel strips, may be embedded or inserted within the cover layers. Steel strips may be preferably employed in such cases where a very thin metal core has been selected, so that its flexural strength in the middle portion must increase at minimum material and constructional costs.

The thickness of the metal core plate is preferably selected as to be substantially less than the thickness of the cover layers. A favorable ratio of the thickness of the metal core plate to the thickness of the cover layers is approximately from 1:3 to approximately 1:6 and a favorable thickness of the metal core plate itself is from about 0.5 to 1.5 millimeters. The aforementioned dimensions proved to be especially favorable when using metal plates in the form of sheets made of steel of grade St 35 or higher.

Full details of the present invention are set forth in the following disclosure and in the accompanying drawings.

BRIEF DESCRIPTION OF THE DRAWINGS

In the drawings

FIG. 1 is a schematic representation of a longitudinal section through the resonator section of a piano, showing the associated portions thereof, FIG. 2 is a perspective view, partly in section, of an embodiment of the soundboard according to the present invention, FIG. 3 is a view similar to that of FIG. 2, showing another embodiment of the soundboard according to the present invention, FIG. 4 is a plan view of still another embodiment of a soundboard according to the present invention, FIG. 5 shows a section view taken along the lines V—V of FIG. 4.

DESCRIPTION OF THE INVENTION

Figure 6:
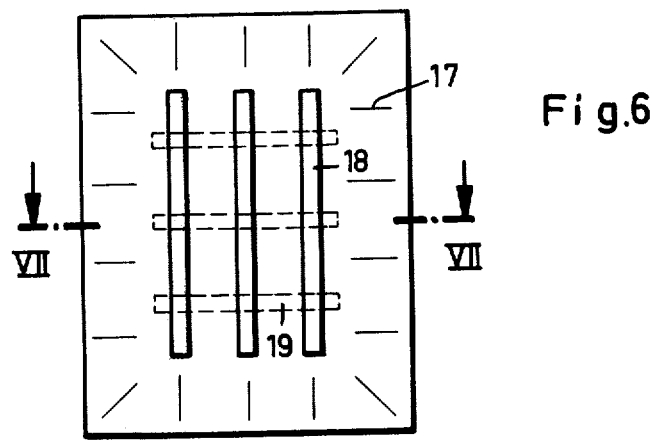
FIG. 6 is a plan view, similar to that of FIG. 4, of still another embodiment of a soundboard according to the present invention.

The resonator body of a piano, as schematically shown in FIG. 1, comprises a cast frame, or harp 1, within which are mounted a plurality of strings 2. One end of each of the strings 2 is fastened to tuning pin 3, which through adequate recesses in the cast frame 1, extends into a pin block 4. The strings are supported at their other end on a sound bridge 5, connected to a soundboard 6, which is supported by a frame 7.

Action of the strings 2 is effected by means of a hammer 8, which is actuated by conventional mechanisms not shown in the drawings. The soundboard 6 is a plate-like element having a comparatively large surface, which in the conventional manner is made of especially selected solid conifer boards having an average thickness of from 7 to 11 millimeters with vertically extending annual rings or graining.

According to the present invention, as shown in FIGS. 2 to 8, the soundboard, of novel construction, is formed comprising a laminate assembly of a metal core plate 9, preferably of steel in the form of a rigid sheet of at least grade St 34, to which is bonded on both sides in full surface contact, one or a plurality of cover layers of wood or of a material, such as plastic, having damping characteristics corresponding approximately to those of wood.

Bonding of the exterior layers to the metal core layer can be effected by employing conventional adhesives, which are waterproof, stable under changes of temperature and humidity, as well as capable of binding wood, and plastic to metals. The choice of adhesive is not otherwise critical. Preferably, the bond is effected under pressure, so that a uniform bond is formed across the entire area of the laminate.

In the embodiment of FIG. 2, the soundboard is formed of a metal core plate 9, having bonded on each of its opposite surfaces, single layers 10 and 11, respectively, which for illustration are shown as a wood sheet, or veneer having their grain or veining extending parallel to the direction indicated by the arrows 12 and 13. Instead of being made from wood, the cover layers 10 and 11 may be made of plastic material, in the form of a plastic sheet having damping characteristics corresponding to those of wood, as from polyester, or epoxy resins, which may also be reinforced by fibers such as glass or mineral fibers. The plastic sheets are arranged to the effect that the orientation of the fibers and/or molecular structure, then corresponds to the arrows 12 and 13.

Reference is made to the German Steel Standard, DIN 17100, dated 1966, published by the Deutscher Normenausschusses, Berlin 30; Page 8 of Stahlschlüssel, published by Stahlschlüssel, Verlag KG., D 7142, Marbach, Germany; Pages 754, 1006 and 1007 of Hütte, Ingenieur-Taschenbuch; Page 531, Dubbels Taschenbuch, for the definition and characteristics (modulus of elasticity, composition, density, flexibility, etc.) of steels having a grade of St 34, St 50, as well as other suitable steels.

The choice of the steel plate core and the wood or plastic outer layers is subject to a great deal of variation, depending on the structure desired. That is, in order to obtain a desired soundboard, the steel plate will be selected in dependance of the resonance required and on the type and thickness of the cover layer selected for damping and vice-versa. A great deal of variation is thus possible. Specifically, and as examples of the present invention, core plates of St 34, St 50, and higher, of a thickness of 0.5 to 1.5 mm. have been made, with single sheet cover layers in a range of thickness of between 3 to 6 times greater. Multiple sheet cover layers in the same dimensions have been made. As indicated, the choice of wood for the cover layer is not critical; it may be the conventional conifers or it may be other wood. The plastic is preferably polyester, or epoxy resins, which may be foamed or not. The plastic may be reinforced as indicated with glass or mineral fibers, if desired. The choice of wood or plastic will depend on the damping characteristics required or desired.

In the soundboard of the present invention, the metal plate respresents the resonator proper, i.e., the vibrating member, while the cover layers take over the function of the damping members. The combination of steel and outer cover layers of wood or plastic leads to a combined modulus of elasticity of the total unit, which is relatively high and can be varied within wide limits, depending on the prerequisites necessary for the production of sound and the resonance capacity, and on the desired character of the sound. Thus, a large ratio of the modulus of elasticity, to the density of the entire laminate construction, can be obtained. Consequently, simple, relatively thin and lightweight soundboards can be constructed, having optimum resonance and damping characteristics.

Due to the fact that the metal plate, especially steel plates, provided in the form of a rigid sheet of at least grade St 34, are distinguished by low damping, practically all the vibrations of the strings, including those of higher frequencies, are transmitted to the air, with the sound volume being increased. There may, however, also occur sharp resonances which are, however, reduced by the damping effect of the cover layers to a desired selected degree.

In the construction of the soundboard according to FIG. 3, the metal core plate 9 is covered on either side by two layers 14 and 15, respectively, which, again, may consist of wood or, preferably of reinforced plastic material. Also, the fiber orientation of adjacent cover layers 14 and 15 is indicated again by arrows 16 and 18, respectively. It can be seen that the grain or fibers of adjacent layers in each cover are oriented at about right angles with each other. This arrangement of two or more cover layers on each surface of the metal plate 9 will be recommendable if a stronger damping is desired or necessary in view of the characteristics of the metal core plate 9. For such cover layers, wood or plastic material may be combined, in alternate layers, as desired. One surface may be wood, the other surface may be plastic. In both embodiments according to FIG. 2, and FIG. 3, the cover layers may also be formed of sub-laminates of plastic material with their fiber orientation changing from one layer to the other.

The soundboard of the present invention has an increased flexural strength, i.e. resistance to flexure which, on the one hand, may be desirable, as it makes a requirement for reinforcing ribs dispensable. On the other hand, it may also exert an unfavorable influence on the vibrating characteristics. This may also be so when steel of greater than St 50 is employed, or the core plate is thick. In order to remedy this drawback, the soundboard may, as seen in FIGS. 4 and 5, be equipped with a peripheral bead 16 arranged along the margin, within the board edge, by which the soundboard is normally held in the frame. By this measure, the flexural strength of the marginal zone is diminished. In a similar way, the flexural strength of the metal core plate can be reduced, as shown also in FIGS. 6 and 7, by punching or providing cuts in the marginal edge. FIG. 6 shows cuttings 17 arranged in uniform, spaced relationship along the margin of metal core plate 9. Slots, longitudinal holes, or the like may also be made.

Conversely, when a very thin metal core plate 9 is used, which even in conjunction with the cover layers, may not ensure a sufficient desired flexural strength of the soundboard, the metal plate may be reinforced.

Figure 7:
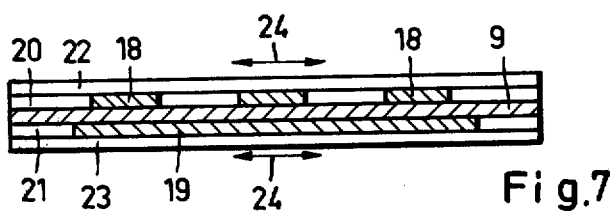
FIG. 7 is a sectional view along lines VII—VII in FIG. 6.

FIGS. 6 and 7 illustrate also how the central area of the soundboard can be reinforced or stiffened by placement of horizontal and/or vertical metal strips 18 and 19, respectively, adjacent one face of the metal core plate. The additional metal strips 18 and 19 may be applied directly to the surface of the metal core, or they may be so arranged that they are embedded in the cover layers 20 and 21, to directly adjoin or if spaced therefrom, cause the cover layer to bear on the metal plate. The cover layers may consist of wood or plastic material in the manner as previously described. These cover layers 20 and 21 may also be covered by another layer 22 and 23, respectively. The fiber orientation of the outermost cover layers 22 and 23, indicated by the arrows 24, extends at right angles with the fiber orientation of the cover layers 20 and 21, are previously described.

Figure 8:
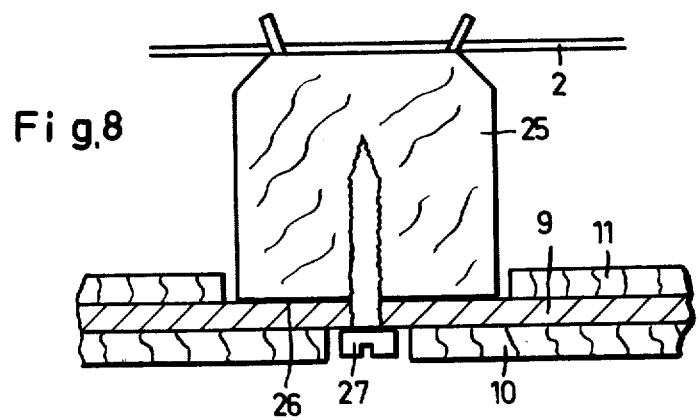
FIG. 8 is a partial section view through a soundboard with associated sound bridge, showing how the soundboard of the present invention may be mounted.

In order to transmit the vibrations from the strings 2 directly to the metal core plate, i.e.: vibration-carrying portions of the soundboard, a sound bridge 25, supporting the string 2, is secured directly to the metal plate 9, as seen in FIG. 8. The fastening means may consist of a glue or adhesive 26 and, in addition, a fastening screw 27. The cover layer 11 is provided with an adequate recess accommodating the sound bridge and, similarly, a recess is provided in the cover layer 10 for passage of the fastening screw 27.

It will be seen from the foregoing that there is not only attained a very large ratio of the modulus of elasticity to the density, but there is also employed a vibration-carrying member having very low damping characteristics, which can be selectively modified by selecting the cover layers. In all prior art constructions of the soundboards heretofore known, the vibration-carrying member had comparatively high damping characteristics which damping could not be decreased but increased only, by the addition of covering layers. As the damping determines the spectrum of the transmissible vibrations for sound emission, it is clear that by means of the soundboard of the present invention, there can be attained transmission conditions much more favorable than was heretofore possible.

Various changes, modifications and variations have been described herein and others will be apparent to those skilled in the art. Accordingly, it is contemplated that the present disclosure be taken as illustrative only and not limiting of the scope of the invention.

What is claimed is:

1. A soundboard for a piano or the like comprising a laminate having a metal core for the production of sound vibration, said metal having a modulus of elasticity and an inherent damping factor corresponding to steel of at least a grade St 34, and at least one outer cover layer bonded thereto in full surface contact on each side thereof, each of said outer cover layers having a damping characteristic corresponding to that of wood.

2. The soundboard according to claim 1, wherein each of said outer cover layers are formed of a single sheet of wood, arranged so that the grain thereof extends parallel to each other.

3. The soundboard according to claim 1, wherein each of said outer cover layers are formed of a plurality of sheets of wood, the sheets of wood in each cover layer being arranged so that the grain thereof extends perpendicular to each other, each of said cover layers being arranged relative to said core in symmetry with each other.

4. The soundboard according to claim 1, wherein each of said outer cover layers are formed of a single sheet of plastic, arranged so that the grain thereof extends parallel to each other.

5. The soundboard according to claim 1, wherein each of said outer cover layers are formed of a plurality of sheets of plastic, the sheets of plastic in each cover layer being arranged so that the grain thereof extends perpendicular to each other, each of said cover layers being arranged relative to said core in symmetry with each other.

6. The soundboard according to claim 1, wherein each of said outer cover layers are formed of a plurality of sheets of plastic and wood, the sheets of plastic and wood in each cover layer being arranged so that the grain thereof extends perpendicular to each other, each of said cover layers being arranged relative to said core in symmetry with each other.

7. The soundboard according to claim 1, wherein the ratio of the thickness of the metal plate to the thickness of the cover layers ranges from approximately 1:3 to approximately 1:6, and the metal plate has a thickness of from about 0.5 to 1.5 millimeters.

8. A soundboard according to claim 1, including at least one sound bridge, said sound bridge extending through a recess in the cover layer and bonded directly to the metal core.

9. The soundboard according to claim 1, wherein the flexural strength of the metal core is reduced in the margin thereof relative to the central portion, by working said metal.

10. The soundboard according to claim 9, wherein said metal core is worked by punching holes or slits, or by forming beads along the margin thereof.

11. The soundboard according to claim 1, including reinforcing members arranged in the central portion thereof to increase the flexural strength.

12. The soundboard according to claim 11, wherein said reinforcement comprises steel strips, inserted into the cover layers.

13. The soundboard according to claim 1, wherein the thickness of the metal plate is substantially less than the thickness of the cover layers.

14. The soundboard according to claim 4, wherein said plastic is selected from the group consisting of polyester, resin, epoxy resins, polyester resin reinforced with glass or mineral fibers, and epoxy resin reinforced with glass or mineral fibers.

15. The sound board according to claim 1, wherein said metal plate is steel.

* * * * *